United States Patent Office.

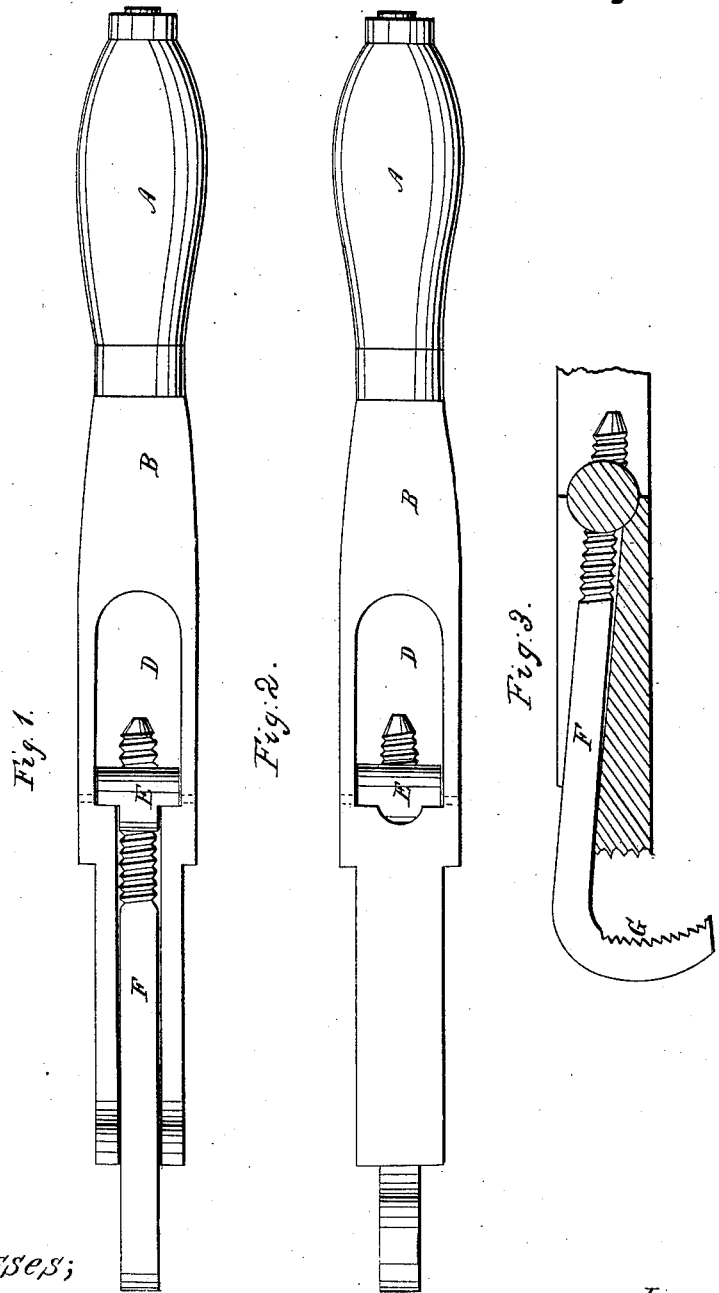

J. L. ORDNER, OF CLEVELAND, OHIO.

Letters Patent No. 65,111, dated May 28, 1867.

IMPROVEMENT IN PIPE-WRENCHES.

*The Schedule referred to in these Letters Patent and making part of the same.*

TO ALL WHOM IT MAY CONCERN:

Be it known that I, J. L. ORDNER, of Cleveland, in the county of Cuyahoga, and State of Ohio, have invented certain new and useful Improvements in Pipe-Wrenches; and I do hereby declare that the following is a full and complete description of the same, reference being had to the accompanying drawings, making a part of this specification, in which—

Figure 1 is a top view of the wrench.
Figure 2 shows the opposite side of fig. 1.
Figure 3, a detached section.
Like letters of reference refer to like parts in the different views.

A, fig. 1, is the handle of the wrench, to which is fitted the shank B. A central section of the shank is cut through, forming the peculiar-shaped opening D, between the cheeks of which is pivoted the nut E. Into this nut is screwed the stem of the hook F, whereas the hook itself projects beyond the end of the shank, and is provided with a number of teeth, G. The end of the shank is also toothed, the purpose of which will hereafter be shown. A groove equal in size to that of the stem is cut along the outer end of the shank, into which the stem drops, as shown in fig. 3.

Having thus indicated the several parts of the improvement, the practical operation of the same is as follows:

The hook is made to clasp the tube so as to bring one side to bear upon the end of the shank. Then on pulling the handle the result will be to draw the hook tight upon the tube and down upon the end of the shank. The nut to which the hook is connected being loose, serves as a fulcrum on which the hook exerts its power as a lever in one direction, and the shank in the other or opposite. By these two opposite forces exerted on the opposite sides of the tube, it is thereby firmly clamped between the hook and end of the shank, and by the notches referred to the tube cannot possibly slip while the wrench is being turned around and around in screwing the sections of the pipe together. On reversing the action of the wrench the hook is relieved from the pipe for the reason of its being attached to the shank by the pivoted nut, which allows it to be drawn out to any distance from the shank, and thus the tube is released. By either screwing the stem into or out of the nut, and thus increasing or lessening the distance between the hook and end of the shank, it can be easily and readily adapted to fit any size pipe.

What I claim as my invention, and desire to secure by Letters Patent, is—

The hook F and pivoted nut E, as arranged and operating within and in combination with the slotted shank B, as and for the purpose set forth.

J. L. ORDNER.

Witnesses:
W. H. BURRIDGE,
J. H. BURRIDGE.